United States Patent
Sharma et al.

(10) Patent No.: US 12,135,372 B2
(45) Date of Patent: Nov. 5, 2024

(54) METHOD AND SYSTEM FOR DETECTING AND MODELING OBJECTS IN SPACE USING LIDAR

(71) Applicant: DIGANTARA RESEARCH AND TECHNOLOGIES PRIVATE LIMITED, Uttarakhand (IN)

(72) Inventors: Anirudh Sharma, Phagwara (IN); G Geetha, Phagwara (IN); Rahul Rawat, Phagwara (IN); Sai Gansesh Reddy, Phagwara (IN); Sikindar Vatturi, Phagwara (IN); Tanveer Ahmad, Bengaluru (IN)

(73) Assignee: DIGANTARA RESEARCH AND TECHNOLOGIES PRIVATE LIMITED

( * ) Notice: Subject to any disclaimer, the term of this patent is extended or adjusted under 35 U.S.C. 154(b) by 438 days.

(21) Appl. No.: 17/435,711

(22) PCT Filed: Apr. 6, 2020

(86) PCT No.: PCT/IN2020/050334
§ 371 (c)(1),
(2) Date: Sep. 2, 2021

(87) PCT Pub. No.: WO2020/202221
PCT Pub. Date: Oct. 8, 2020

(65) Prior Publication Data
US 2022/0155452 A1 May 19, 2022

(30) Foreign Application Priority Data
Apr. 4, 2019 (IN) .............................. 201811037422

(51) Int. Cl.
*G01S 17/89* (2020.01)
*B64G 3/00* (2006.01)
*G01S 7/48* (2006.01)

(52) U.S. Cl.
CPC ................ *G01S 17/89* (2013.01); *B64G 3/00* (2013.01); *G01S 7/4808* (2013.01)

(58) Field of Classification Search
CPC .......... G01S 17/89; G01S 7/4808; B64G 3/00
See application file for complete search history.

(56) References Cited

U.S. PATENT DOCUMENTS 6,484,073 B1 * 11/2002 Fichter .................... G01S 5/163
701/4
8,628,044 B2 * 1/2014 Poulos ................... B64G 1/646
244/172.4

(Continued)

*Primary Examiner* — Gregory M Desire
(74) *Attorney, Agent, or Firm* — Jose Cherson Weissbrot

(57) ABSTRACT

A method for detecting and modeling objects in space using LIDAR is disclosed. The method includes transmitting a laser beam to detect at least one object in space. Further, the method includes detecting one or more data related to at least one object. The detection is based upon the principle of reflection of the object in a vacuum. Further, said one or more data related to at least one object obtained from the detection unit is processed. Further, one or more information is determined from the processed data related to at least one object. The one or more information is mapped corresponding to the related at least one object. The method further comprises measuring one or more parameters associated with at least one of the mapped objects and modeling the measurement data related to at least one of the mapped objects.

9 Claims, 5 Drawing Sheets

(56) References Cited

U.S. PATENT DOCUMENTS

| | | | | |
|---|---|---|---|---|
| 8,892,271 B2* | 11/2014 | Breed | ............... | G08G 1/161 |
| | | | | 701/2 |
| 9,551,582 B2* | 1/2017 | Hoffberg | ............ | G01C 21/3691 |
| 9,573,702 B1* | 2/2017 | Jacomb-Hood | ....... | G01S 13/865 |
| 9,652,864 B2* | 5/2017 | Hayashi | ............... | G06T 7/285 |
| 9,918,873 B2* | 3/2018 | Woodley | ............ | G01B 9/02091 |
| 10,127,816 B2* | 11/2018 | Hoffberg | ................ | G08G 1/20 |
| 10,353,053 B2* | 7/2019 | Rohani | ................ | G01S 7/417 |
| 10,436,574 B2* | 10/2019 | Geswender | ............... | G01S 1/70 |
| 10,530,478 B2* | 1/2020 | Kingsbury | ......... | H04B 7/18515 |
| 10,535,144 B1* | 1/2020 | Moshtagh | ............. | G06F 18/251 |
| 10,540,571 B2* | 1/2020 | Hoover | ................ | G01N 21/21 |
| 11,360,216 B2* | 6/2022 | Atalla | ................ | G05D 1/0231 |
| 2018/0222604 A1* | 8/2018 | Garus | ................ | B64G 1/646 |
| 2020/0025927 A1* | 1/2020 | Reed | ................ | G01S 7/4808 |

\* cited by examiner

METHOD AND SYSTEM FOR DETECTING AND MODELING OBJECTS IN SPACE USING LIDAR

FIELD OF THE INVENTION

The present disclosure described herein, related to space technology more particularly to detect, map, analyse and catalogue the objects in space using laser technology.

BACKGROUND OF THE INVENTION

Trillions of people around the globe use satellite data to forecast weather, exchange messages, communicate to people, manage finance etc. In addition to this, satellite data is crucial to manage and mitigate natural disasters, monitor climate and also for national security. Till date 8950 satellites are launched into space and out of that 5000 satellites are currently orbiting the earth. But only 1950 are operational. Approximately 500 collisions, break ups and explosions have occurred which has resulted in further fragmentation of debris. The defunct satellites and spent rockets in space are posing a threat to existing and future space missions.

A space debris or space junk generated through human space activities becomes a serious danger to satellites, space craft, spaceship and future space travel. The debris may produce in one of three ways: missionary operations, accidental incidents, or intentional creation. Table below gives us the indication of this non-functional debris.

| Volume of space debris | Number of objects |
|---|---|
| >10 cm | 34000 |
| 1 cm to 10 cm | 900000 |
| <1 cm | 130000000 |

Small space debris (less than 5 cm) are large in number and widely distributed in the orbit, makes it difficult to monitor and position tracking which causes the pollution in space has been a threat to security of the spaceship in the orbit.

But the fact that, a substantial fraction of debris objects in the I-5 cm range orbiting the earth in LEO with a hypervelocity of 27,400 kilometres an hour is not being tracked neither mapped can't be ignored. And even a minute piece of junk results in a serious hazard for satellites, spacecraft, and spacewalking astronauts.

It is also found that these space debris move very fast and reach up to 18,000 miles per hour, which is seven times faster than a bullet. Current space explorations and operations face a safety risk to people in earth and property in space owing to the volume and rate of speed of these space junks in lower earth orbit. The problem of identifying and managing space debris is an international challenge.

In an exemplary solution, illustrating a Phenomenological orbital debris impact risk assessment model and software for low-Earth orbit (LEO). The collision probabilities, hazards in the near term, fragments size and velocity and many more using thermodynamic based code architecture.

Further, another exemplary solution illustrates a system and method for creating an artificial atmosphere for the removal of space debris based on an artificial atmosphere delivery system (AADS), through a combustible propellant to create artificial atmosphere in the path of space debris.

In yet another exemplary solution, a satellite-equipped laser is disclosed to detect the position and distance of the space debris using a sensor concept to detect small debris with sizes ranging between approximately 1.0 and 0.01 cm. It also uses a CCD camera interfaced with a wide angle lens. The disadvantage of this system is that it uses a permanently illuminated light sheet resulting in wastage of power resources and it is designed to spot debris in the vicinity of a host spacecraft.

In yet another exemplary solution, addresses the feasibility of using point clouds generated with a single-beam laser rangefinder (LRF) to reconstruct the three-dimensional shape of an unknown Resident Space Object (RSO), employing a combination of relative motion between the chaser and the RSO and chaser attitude motion.

One or more solutions stated above have many constraints and limitations. One of the major problems that flashes in front is mapping of this debris, as no action can be taken for the debris which are not in the data sets. This problem has taken the threat to a new level where the collision probabilities and estimation can't be calculated because of the missing spatiotemporal information of this debris. So cataloging these unmapped debris has become an important issue of concern in the aerospace and frontier area. Further, said solutions are not feasible enough to put onboard the smaller size. The existing space-based designs work on either bulky models or require multiple satellites for the single technology to operate. These technologies are neither modular, nor are they competent enough to fly onboard CubeS ats or nano satellites.

Thus, there is a need for a solution to overcome at least one of the aforementioned deficiencies of the existing techniques.

A substantial fraction of debris objects in the I-5 cm range orbiting the earth in LEO with a hypervelocity of 27,400 kilometres an hour is not being tracked neither mapped and can't be ignored as even a minute piece of junk results in a serious hazard for satellites, spacecraft, and spacewalking astronauts.

SUMMARY OF THE INVENTION

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a method for detecting and modeling objects in space using LIDAR is disclosed. The method comprises transmitting a laser beam by an onboard mechanism in a satellite to detect at least one object in space. The method further comprises detecting one or more data related to at least one object by a detection mechanism onboard the satellite. Further, said one or more data related to at least one object obtained are being processed by communicating data from the satellite to a terrestrial ground station. The one or more information is determined from the processed data related to at least one object. Further the one or more information is mapped corresponding to the related at least one object. The method further comprises measuring one or more parameters associated with at least one of the mapped objects. The measurement data are modeled related to at least one of the mapped objects The proposed solution uses (light detection and ranging) LIDAR technology which transmits pulsed laser cone to map the debris of size less than 5 cm and further the detection unit in the present case is mounted on the satellite body. The proposed solution gives a unique solution to foundational mapping data of debris less than 5 cm and services to lessen the risk of collisions. These services include rapid orbit determination, early operational support, ongoing orbit awareness, collision probability analysis, Hamiltonian of debris and flux density of debris over an area. Further, in the proposed solution, there are no data processing units used in the satellite body, this has reduced the data capture to transfer delay to a very low value and has reduced the extra power consumption taken by the processing unit. Further, the maintenance cost is negligible.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

The foregoing detailed description of embodiments is better understood when read in conjunction with the attached drawings. For better understanding, each component is represented by a specific number which is further illustrated as a reference number for the components used with the figures.

Figure 1:
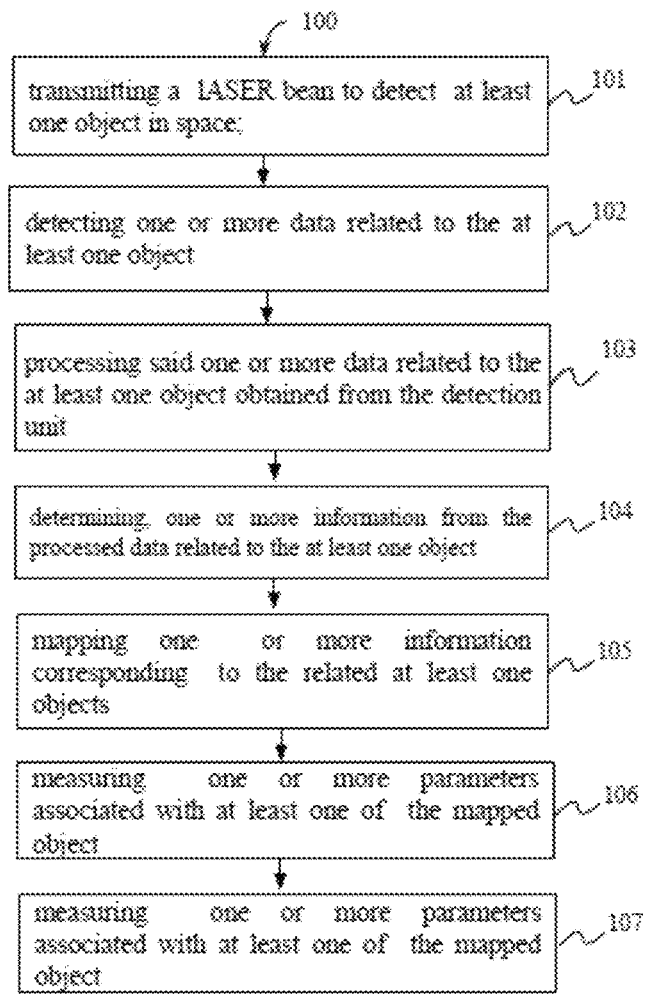
FIG. 1 illustrates a method (100) for detecting and modeling objects in space using LIDAR, in accordance with the embodiment of the present invention.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE PREFERRED EMBODIMENTS

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

Referring to FIG. 1, illustrates the method for detecting and modeling objects in space using LIDAR, in accordance with the embodiment of the present invention. The method (100) may be implemented by a system (200) comprising a satellite and a ground station, as described in description of FIG. 2.

At block 101, the method includes transmitting a laser beam to detect at least one object in space.

At block 102, the method includes detecting one or more data related to the at least one object;

At block 103, the method includes processing said one or more data related to the at least one object obtained;

At block 104, the method includes determining one or more information from the processed data related to the at least one object;

At block 105, the method includes mapping one or more information corresponding to the related at least one object;

At block 106, the method includes measuring one or more parameters associated with at least one of the mapped objects;

At block 107, the method includes modeling the measurement data related to the at least one of the mapped objects.

The steps 101 and 102 are executed by the satellite, while the steps 102 till 107 are executed through operational interaction between the satellite and the terrestrial station. According to an embodiment of the present invention, a satellite body is sent to the space which is mounted with the LIDAR technology. The satellite body acts as an orbiting scanner in order to provide the detection of the whole region over a specific range. The satellite body is mounted with a LASER source and a detection unit for detection of the objects in space. The LASER source is based on the principle of reflection of an object in a vacuum. In an implementation of the invention, the LASER band range is in between 445 to 455 nm, because there are no natural sources of light in the area scanned by the satellite body, the interference will be near zero or practically zero. In vacuum, there should be no reflection unless there is any object in the beam path of the LASER. A part of the reflected radiation will be captured by the mounted detection unit for at least one of the objects found in the scanning area of the satellite body.

Further, according to said embodiment of the present invention, the LASER source and the detection unit are mounted on a satellite body on the zenith side at a conic angle defining the scanning area of the satellite body. The at least one or more objects that pass through this scanning area of the LASER cone will reflect the laser which will be sensed by the detection unit. The detection unit is tuned to the precise frequency of the LASER and detects one or more data related to at least one object by receiving a reflection corresponding to at least one object.

According to said embodiment of the present invention, the objects in space move with hyper velocities, at speed higher than 7 km/sec. The LASER source and objects are, therefore, made to function in the nanosecond scale as to take the reflection values.

Furthermore, according to said embodiment of the present invention, one or more data related to the at least one object are LASER fire time (tO), LASER receiving time (tI), Intensity of LASER fired, Intensity of LASER received, time stamp reading. The LASER fire time (tO) indicates the time when the LASER beam is being transmitted towards at least one of the objects in the scanning area of the satellite body. The LASER receiving time (tI) indicates the time when the reflection from at least one of the objects is being received by the detection unit. The reflection thus received comprises said one or more related to the at least one object.

Furthermore, according to the embodiment of the present invention, said one or more data related to at least one object are processed. The one or more data related to at least one object are processed by applying certain algorithms and modeling techniques. While processing the one or more data related to at least one object, the one or more data are correlated with various parameters calculated from the satellite body such as satellite's attitude determination, position and time. The processing is being done using one or more trigonometric expressions and differential calculus.

Once the processing is being done, one or more information from the processed data related to at least one object is determined. The one or more information includes but not limited to position of the at least one object detected, distance between at least one object detected and the satellite body, direction of the at least one object detected relative to the satellite body; and apparent size of the at least one object detected.

According to one implementation, the satellite body will also track the exact coordinates of satellites at LASER receiving time (tI). The relative coordinates of the objects are calculated, and the satellite absolute coordinates are noted which are then correlated and processed through differential calculus and thereby provide the result as exact coordinates of at least one of the objects.

In one implementation, for finding the coordinates of the at least of the objects, the number of objects under the laser cone (scanning area of the satellite) are quantified by comparing the intensities of reflections (intensities of the LASER fired and intensity of the received) and by calculating the velocity vector of objects through constant tracking of state values of objects and measuring the relative difference in space time.

According to said embodiment, mapping, one or more information is mapped corresponding to the related at least one object. Furthermore, one or more parameters associated with at least one of the mapped objects are measured.

The one or more parameters includes but not limited to spatiotemporal information of the at least one of the mapped objects, Lagrangian of the at least one of the mapped objects, Hamiltonian of the at least one of the mapped objects, flux density of the at least one of the mapped objects over an area, of the objects, collision probability analysis (chances of collision between satellite or at least one of the mapped object).

The parameter spatiotemporal information of the object, manages the space and time information, tracking of moving objects, location and various other related information about objects.

The parameter Lagrangian of the object is used to calculate geodesics of the mapped objects.

Another parameter Hamiltonian of the object determines the variation of total energy of objects in its orbit.

Another important parameter is Collision Probability Analysis which indicates the chances of collision between the satellite body and at least one of the mapped objects.

The one or more parameters are determined by one of mathematical modelling, simulation techniques and triangulation techniques. Furthermore, the measurement data related to the at least one of the mapped objects are modeled. The model thus formed from the measurements data related to the mapped one or more objects found is further used to mitigate the risk of collision which includes services rapid orbit determination, early operational support and ongoing orbit awareness.

In one implementation, various technical performance parameters are set for the detection unit and the LASER source mounted on the satellite body includes output vs. input power of laser, operating temperature, charged coupled device (CCD) resolution is a function describes the number of pixel and size of the image, and their relative beam range and conic angle, Central Processing unit (CPU) processing time and algorithm efficiency. Various technical performance parameters includes:

Output vs. Input power of LASER: This is the ratio of the output power over input power that has been set as a performance measurement to check the efficiency and performance of the LASER. The Input power is taken as the voltage tries to operate as laser and the output power as the intensity of the beam emitted by it.

Operating Temperature: This parameter is set to check the durability and the tolerance of the LASER, which will be operating in a temperature of 40 degree centigrade.

CCD Resolution: The resolution of the sensor used, i.e. CCD is to be checked for the resolution created by it for the distant objects and how clearly it can distinguish between them.

Beam Range and Cone Angle: This parameter is set to check the maximum range of the beam through which we can detect the object and the conic angle is the angle of dispersion required in order to maintain the intensity and the detecting capability of the laser.

CPU Processing Time: This parameter is set to compare between the various mathematical models. It is set to pick the least processing time taking model to be implemented in the CPU.

Algorithm Efficiency: This has been chosen as total productive maintenance (TPM) to develop the suitable, efficient and optimal algorithm to map the objects.

Figure 2:
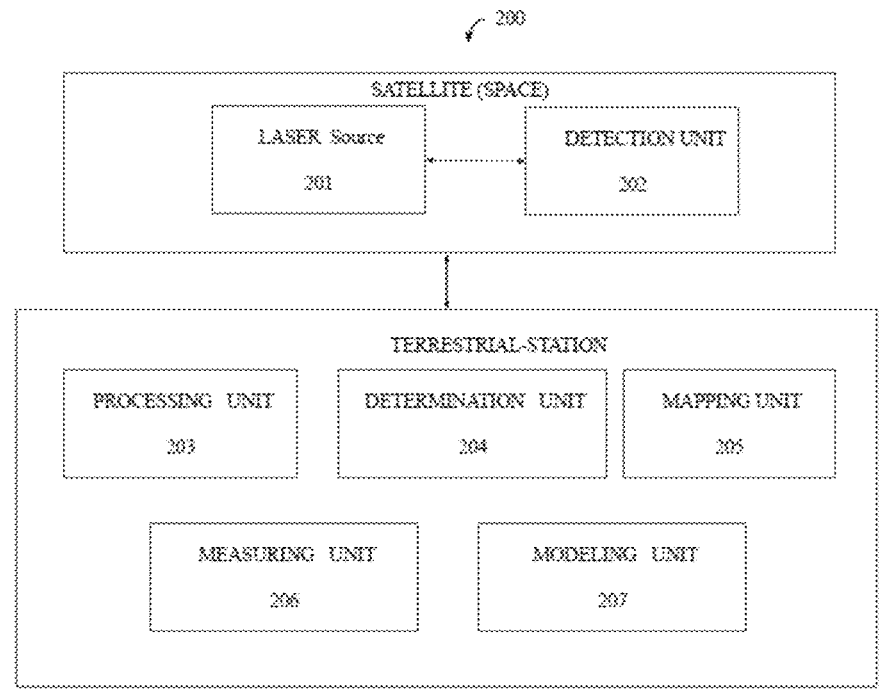
FIG. 2 illustrates an object detection system for detecting and modeling objects in space using LIDAR, in accordance with the embodiment of the present invention.

Referring to FIG. 2, illustrates an object detection system (200) for detecting and modeling objects in space using LIDAR in accordance with the embodiment of the present disclosure. The block diagram illustrates a description of one or more units of object detection system (200). The system consists of a LASER source (201) to transmit a laser beam to detect at least one object in space. The system consists of a detection unit (202) for detecting one or more data related to at least one object. Both are constituted within the satellite orbiting around the earth in space the said one or more data related to the at least one object received from the detection unit (202) are being processed using the processing unit (203) located terrestrially at a ground-station. Further, a determination unit (204) determines one or more information from the processed data related to at least one object. Further, one or more information is mapped using a mapping unit (205) corresponding to the related at least one object. The system (200) further comprises a measuring unit (206) to measure one or more parameters associated with at least one of the mapped objects. Further, the measurement data are modeled related to at least one of the mapped objects using a modeling unit (207).

The object detection system (200) system on board the satellite comprises (not illustrated in figure) of an Arduino integrated development environment (IDE), a power source, (advance Reduced instruction machine (RISC) machine (ARM) cortex processor, sensor, photo detector, charged coupled device (CCD), and LASER beam. Furthermore, the system also comprises of some software tools Matrix laboratory (MATLAB) is a numerical computing environment and programming language, ORIGIN PRO is a graphic software and offers advanced analysis tools, Laboratory Virtual Instrument Engineering Workbench (Lab VIEW) provides system design platform for visual programming, SolidWorks is a computer-aided engineering (CAE) and computer-aided design (CAD) computer program and FreeFlyer software specially design for space mission design, analysis and operation to develop the model and run the implementation.

According to an embodiment of the present invention, there are no data processing units used for processing the captured data in the satellite body. The one or more data detected from the detection unit are being directly transmitted to the earth station (ground station) as raw data. The ground station is the main processing unit, where the processing is being done applying certain algorithms and modelling techniques. The advantage of this is that it has reduced the data capture to transfer delay to a very low value and has reduced the extra power consumption taken by the processing unit.

Figure 3:
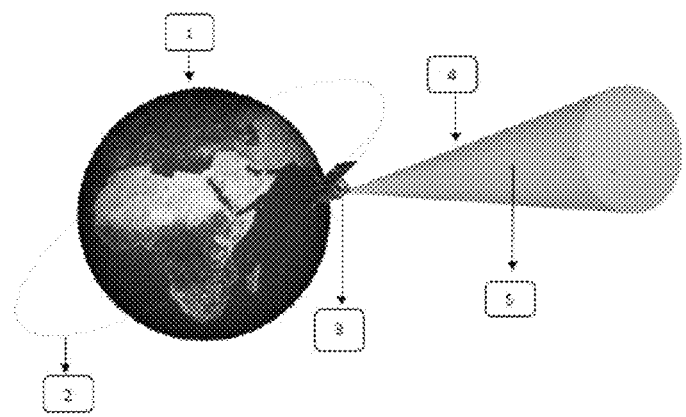
FIG. 3 is an exemplary illustration in accordance with the embodiment of the present invention.

Referring to FIG. 3, is an exemplary illustration that shows the basic structure representing the earth and satellite body consists of Earth (1), orbit (2), satellite body (3) conical LASER beam (4) and object in space (5).

The payload is a time-of-flight LASER range finder based on the principle of reflection of an object in a vacuum. A part of the reflected radiation will be captured by the onboard photo detector tuned to the precise frequency of the laser and the proper circuitry will calculate the time of flight and amplitude of the reflection. The calculations are appropriated for precise spacecraft's attitude determination, position and time and thereby the relative measure of an object or debris.

The satellite body (3) acts as an orbiting scanner providing the mapping of the whole region over a specific range. In an implementation of the present invention, the LASER source and the detection unit are operating in the nanoscale. The LASER source and the detection unit takes multiple data values of the objects and provides the precise information of the object. The multiple data values refer to detecting one or more data related to the at least one object multiple times. The multiple data values will form a locus which is further processed by correlating with various parameters calculated by the satellite to determine equations of the orbit using one or more trigonometric expressions and differential calculus. The determined equations of the orbit are used to track the current position of at least one of the objects and predicting the future path position as well.

Thus, the future position predictions and orbital behavior of the objects in space are modeled. A model defining the distribution and current quantities of at least one of the objects from objects measurement data is disclosed and how this is used in formulating measures to both counter objects in the design of satellites and minimize collision damage.

Overall, with the data received, a precise analysis can be made of the future position predictions and orbital behavior of the debris environment. Satellite (3) is equipped with LASER technology, in which conical LASER beam (4) is the angle of dispersion required in order to maintain the intensity and the detecting capability of the laser for mapping and detecting the space debris (5).

Laser emitter along with the Laser reflection receiver having 150° field of view (LRF) has been mounted on the zenith side and its scan area is controlled by space craft's attitude control (magneto torquers). This laser cone is the scanning area of the satellite. Any debris which passes through this volume will reflect the laser which will be sensed by the Laser sensor and LRL01 Payload will write a register on the LRL01 mass storage device, composed of the following elements tabulated as follows:

| Description | Type | Word | Source |
| --- | --- | --- | --- |
| LASER emission time | Signal | 10 bytes | LRF01E |
| LASER reflection receive time | Signal | 8 bits | LRF01R |
| LASER emitter output power | Voltage/current | 24 bites | LRF01E |
| LASER reflection signal amplitude | Voltage | 24 bites | LRF01R |
| Sun sensors in all surfaces expect X | Matrix | 12 bytes | Sun sensors |
| 3-Axis Magnetometer on IMTQ | Vector | 8 bytes | IMTQ |

Figure 4:
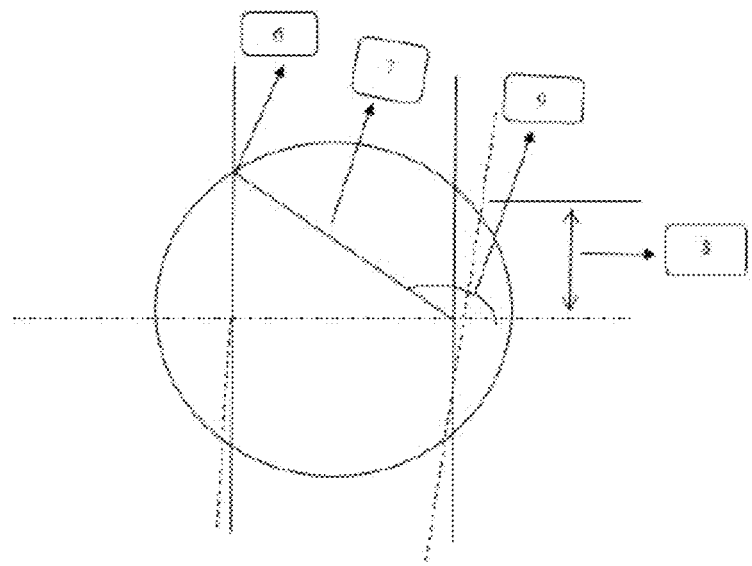
FIG. 4 illustrates a mathematical model in accordance with the embodiment of the present invention.

Referring to FIG. 4, illustrating a mathematical model indicating various parameters computed by the satellite which can further be correlated with the one or more data related to the at least one object for processing, comprises of my (6), the position of object from its origin of focus, position vector of object with respect to origin of focus (7), semi *latus* rectum geometry constant (8), the angle between the constant vector and the position vector (9). These are the various parameters including spatiotemporal information of at least one of the objects. Further, the processed information is used to determine the one or more information related to the at least one of the objects. Said information manages the space and time information, tracking of moving objects and mapping of the objects.

Figure 5A:
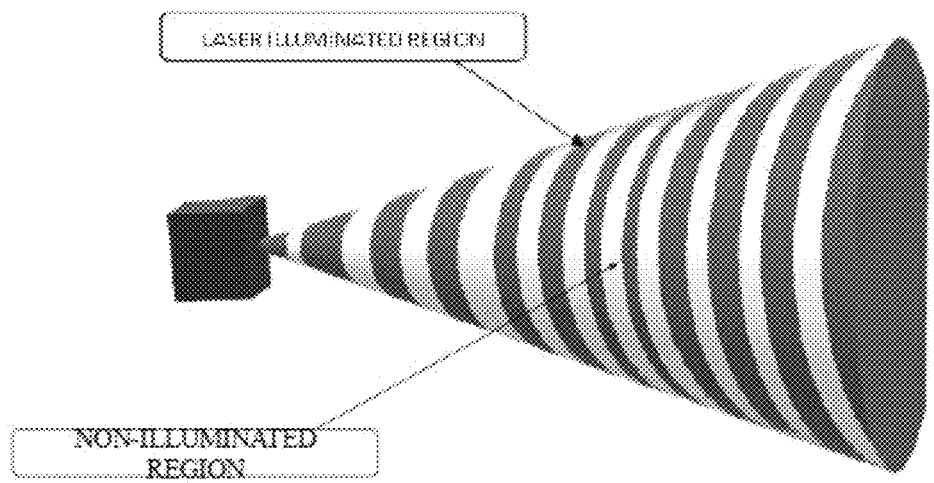
FIG. 5 illustrates a satellite body structure having the LASER source and the detection unit is mounted on it in accordance with the embodiment of the present invention.

Referring to FIG. 5a, illustrating a satellite body structure having the LASER source and the detection unit is mounted on it. The satellite body structure is very compact and efficient. The technical performance parameters as explained above like: Range, Average SNR, Power consumption, Cost, Size, Compatibility in Space Applications, Ease of Use in Small satellites are taken into consideration while designing a satellite body structure. Further, the use of LASER reduces the overall size, reducing the overcall cost. Further, as explained above in the description that LIDAR where the pulsed laser is transmitted to one or more objects in the space in order to take the multiple & individual reflection values for the reflection from the one or more objects using the detection unit. Furthermore, the pulsed laser ensures as the different data points are received for the reflection values of the detection unit.

Figure 5B:
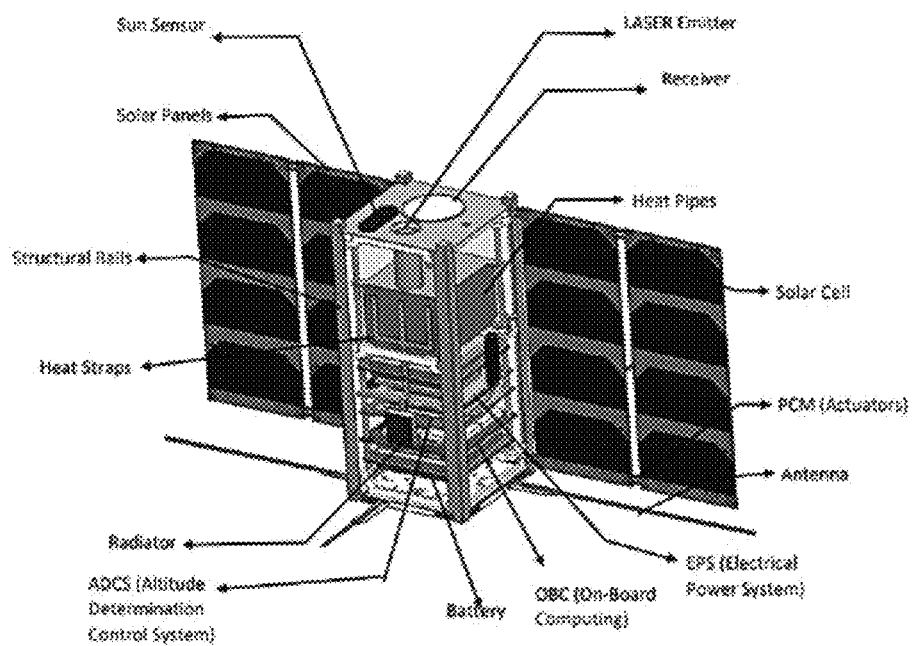

FIG. 5b illustrates a 2 U satellite model, containing all the necessary subsystems.

The satellite system illustrated above is a ready to launch satellite system with the In orbit debris detector embedded into it.

The part of the system marked and highlighted (1) is the Debris Detector, which comprises the LASER and Sensor Module. These modules work in sync with each other and operate in nanoscale scale.

The data written by the sensor on the memory buffer will contain these parameters; LASER fire time (tO), LASER receiving time (tI), Intensity of LASER fired, intensity of laser received. One more parameter will be included in these parameters by the on board computer, i.e. SUNSENSOR readings at the time stamp tO and tI.

As the Debris are moving with hyper velocities, at speed higher than 7 km/sec, the laser and debris are made to function in the nanosecond scale as to take the reflection values. These values will comprise the Reflection intensities and the angle values of the reflection values from debris. The satellite also has a space based integrated, which will track the exact coordinates of satellites at the time of reflection. This data will be processed through the trigonometric expressions and the Range and position of debris in reference to the Satellite can be received. The relative coordinates of the debris are calculated, and the satellite absolute coordinates are noted which are then merged and processed with differential calculus and thus gives the result as exact coordinates of debris.

The Debris detector operating in the nanoscale scale takes multiple data values of the debris and provides the precise information of the junk. These multiple data points will form a locus which when processed with differential calculus will provide the equations of its orbit, thereby tracking it's current position and predicting it's future path position as well.

Example satellite details with respect to FIG. 5b have been presented under following heads:

A. ADCS—Robust integrated ADCS by CUBE
  Cube Computer—ADCS computer & serves as redundant OBC
  2*Ferrite Magnetic torquers
  1*Air coil Magnetic torquers
  3*rate sensors
  10*coarse sun sensors
  3 axis magnetometers
  Fine sun & horizon sensor
  3*Reaction wheels
  Radiation hardening 20 kRad
  Attitude measurement<0.6°
  Attitude control<G
  Rate measurement<0.027 s
  Power: 3.3V or 5V @ 850 mW nominal
  Mass: 550 gm
  Volume: 0.65 U
  Flight proven library: detumble, high rate detumble, very high rate detumble, b dot, Y-thomson, XYZ-wheel control, sun tracking & target tracking.

B. OBC, TT&C Lasercomm—ICEPS
  Bus type: USB 2.0
  OBC:
  Xilinx Zynq XC7Z010
  Programmable Logic (PL)
  –28K Logic Cells
  –2.1 Mbits Block RAM
  –30 DSP slices
  Processor System (PS) Specification:
    Dual-core ARM Cortex A9 CPU running up to 733 MHz
    Linux 4.11
  512 MB of DDR3L RAM
  32 MB of QSPI flash storage for uboot
  Temperature Sensor Resolution: 1 deg C.
  OBC/OS: Linux computer running IOS
  Radio:
  SDR from 70 Mhz to 6 GHz
  EIRP 28.5 dBm integrated LNB
  Sensitivity: –110 dBm
  Antenna ports: 2 RX and 1 Transceiver (TX/RX)
  System Storage: 256 or 512 Gigabytes
  Number of ports: 14 total: 8 external, 6 internal; USB2.0 60 MB/s rw
  High Speed Laser Communications
  400 nm or 450 nm solid state laser, temperature aperture, variable focus. Integrated temperature sensor range
  Power rails: 5V@3 A; 12V@3 A (adjustable), 12 A; 1 auxiliary APU port
  Battery Packs: 50 W nominal
  Power delivery: 50 W Nominal (continuously), 65 W Maximum, 100 W peak for 2.5 sec.
  Solar Mgmt: 4 UMPPT channels 16V@2 A max each
  Solar charger: Based on TP5100 2 A continuously, IS, 2S, 3S
  Internal sensors: 20 internal sensors; integrated IMU
  Actuators: Integrated automatic management of Release/deploy mechanisms; integrated automatic LNB/PA switching
  Built in protection RBL; 10 A Activation switch w/MTBF>1000, 2 A and 7 A resettable fuses
  inertial Measurement Unit:
  6-axis Motion Tracking Device: (3-axis gyroscope, 3-axis accelerometer)
  TDK/InvenSense ICM-20602
    Gyroscope sensitivity error: ±1%
    Gyroscope noise: ±4 mdps/Hz
    Accelerometer noise: 100 pg/g/Hz
  Mass 150 grams
  Operating temp. –50 C to +125 C
  Dimensions 96×96×25 mm C. ANTENNA—ISIS deployable Antenna
  Envelope stowed: (1×w×h) 98×98×7 [mm3] (supplied aluminum cover plate included)
  30 mm diameter centre through-hole for pass-through of payload or other interfaces
  Mass: <100 g
  Operational Temperature Range: –20 to 60° C.
  I2C Interface
  Miniature 9 pin OMNETICS connector
  Rf input/output 1-2 MMCX, female, 50 Ohm
  Power Consumption:
    Nominal: <40 mW (3V3 model)
    Nominal: <60 mW (5V model)
    During Deployment: 2 W
  Frequency Range:
    >10 MHz useable bandwidth in frequency range specified Max RF Power: 2 W
Antenna Return Loss at resonance frequency>10 db (VSWR>2:1)
Deployment Duration: <3 s above 15° C.
Antenna main beam gain:
  UHF: 0 dB o
  VHF: 0 dBi
D. Deployable Solar Array
  Gentle release and deploy with artificial muscles
  Sturdy Titanium CP-2 scaffold, 99.8% pure.
  Release in 19 seconds, Deploy in 10 seconds, no backlash
  Reflective NEMEA layer-0 Anti-VUV and thermal protection mounted on FR4-Tgl80 panels
  Heritage, robust diodes installed by default
  Includes Release and Deploy contact sensors
  Sun sensors and temperature sensors on demand
  Designed for LEO missions and requirements
  Space heritage from NEE-01 PEGASUS, NEE-02 KRYSAOR and IRVINE01
  Custom titanium harnessing included
  Manufactured according to space standards and custom mission design
  Functional, performance, thermal bake out and vibration tests provided with documentation.
  Very thin, 6.5 mm folded, each panel is only 1.5 mm thick
  Discounts for complete mission sets
  Compatible with ISIS and Pumpkin Structures
  Compliant to CubeSat Standard
  Compatible with QuadPack and IS IPOD Launch Adapters
  Custom Interface available
  Side 1 U panel, deploys as 7 panels (4 on top side, 3 on bottom side)
  Integrated NEMEA Anti Radiation (EM, High Gamma, X-Ray, Alfa, Beta and low neutron) shield
  GaAs Triple-junction solar cells AzurSpace 3G-30 (yielding 12 W per array)
  Supply Voltage:
    3.6V to 19.2V top side
    1.8V to 14.4V bottom side
  2 A@20V Schottky diodes integrated
  Power Delivered:
  Condition full sunlight in LEO
  1 U Low cost solar cells: 2.75 W minimum
  1 U High power AzurSpace 3G-30: 7.2 W minimum
  Cell Efficiency: 28% (High power) or 19% (low cost)
  Release in 19 seconds using 152 joules
  Deploy in 10 seconds using 52 joules
E. Structure
  Custom Structure is made as per the unique requirements posed by LPUSAT-1, a CubeSat with multiple payloads to enhance its effectiveness.
  inputs from LV is also required for launch loads
  Mass<250 gms
  Material: Al 7071

Figure 6:
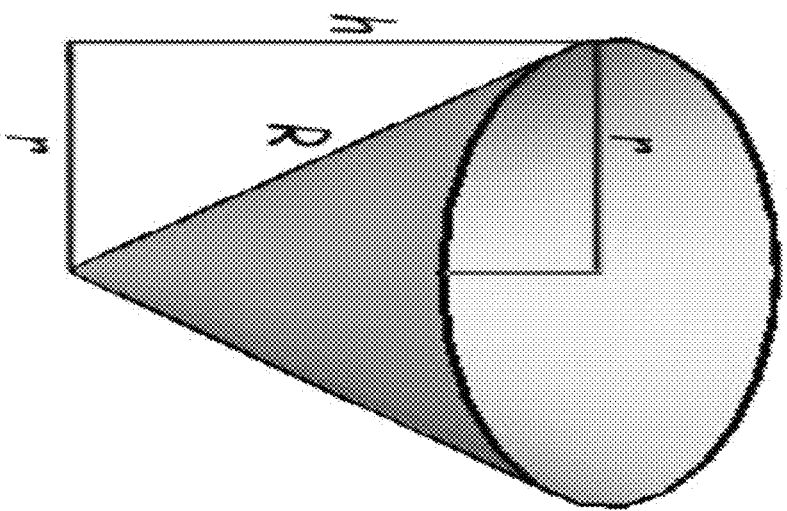
FIG. 6 illustrates a mathematical model to cover the maximum area and to gain more range of the LASER from the LASER source in accordance with an embodiment of the present invention.

Referring to FIG. 6, illustrating a mathematical model to cover the maximum area and to gain more range of the LASER from the LASER source in accordance with an embodiment of the present invention. The LASER beam is projected in the form of a LASER cone (scanning area), FIG. 6 illustrates the LASER cone projected with range "X" and radius "R". In order to maximize the area coverage, the volume cone must be maximized, through the following equation:

Let us assume that V represents the volume of cone, Then $rr2$, $r-rn$

3

Also, by Pythagoras theorem:

$R^2 = r^2 + h^2$ $r^2 = R^2 - h^2$

Replacing r in the equation of V, $$v = \frac{\pi}{3}(R^2 h - h^3)$$

Keeping a note that for a given value of height (h) and radius (r) of cone, the value of Sant Height (H) is always constant. Therefore, differentiating the volume with respect to height (h):

$$\frac{dv}{dh} = \frac{\pi}{3} \frac{d}{dh}(R^2 h - h^3)$$

$$\frac{dv}{dh} = \frac{\pi}{3}(R^2 h - h^3)$$

The critical point is approached when the derivative of volume approaches zero: Therefore, Substituting the value of h in $$r^2 = R^2 - h^2$$

$$r^2 = R^2 - \frac{R^2}{3}$$

$$r = \sqrt{\frac{2}{3}} R$$

The Value of r & h can be maximized from the above equation, however, according to the specific range requirements, the value can be altered, which will be directly impacted by the Power output of the LASER.

Furthermore, the (pulsed) LASER pulses are directly proportional to the power output required and the velocity of objects in space. Since the Power specifications of the satellite differ from one to another and cannot be assumed generally, yet the velocity of the objects is known and is defined for orbits, To calculate the path of one or more objects precisely, the LASER source and the detection unit takes multiple data values of the objects and provides the precise information of the object. The multiple data values refer to detecting one or more data related to the at least one object multiple times. The multiple data values will form a locus which is further processed by correlating with various parameters calculated by the satellite to determine equations of the orbit using one or more trigonometric expressions and differential calculus as explained below. The determined equations of the orbit are used to track the current position of at least one of the objects and predicting the future path position as well.

As to get the object information with up to a data point of more than 100 observations, for as close as the 1 km range from the satellite. In an embodiment of the present invention, the one or more objects in LEO orbiting the earth at around 7 km/sec.

In an example, let us assume the 1Km is the total distance travelled by one or more objects in the LASER cone, for which a dataset of 1000 points is to be observed, Then, if 1 km is covered with 7 km/sec, a total time covered in the cone is of 0.1428 seconds. As to observe a minimum of 1000 data points in 0.1428 second, a microsecond operated laser has to be used. However, for the detection unit, rise and fall time should fall in the range of microseconds to Nanoseconds, as for example, if a closest Distance of 2 km is to be measured by the technology, then the read rate of detection should be in the microsecond range up to few thousand nanosecond range.

Figure 7:
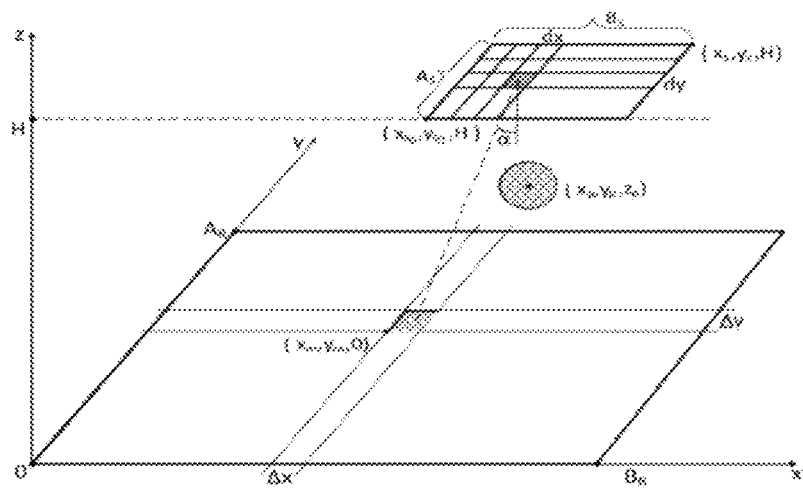
FIG. 7 graphical illustration of the geometry of the inline CMOS matrix detection unit for detection of an object by reflection value in accordance with an embodiment of the present invention.

Referring to FIG. 7, depicting a graphical illustration of the geometry of the inline CMOS matrix detection unit for detection of an object by reflection value in accordance with an embodiment of the present invention. Let us assume that the object is introduced as the plane with dimensions of AS and BS. The Cartesian coordinates of the lower left corner are denoted as (xSO, ySO, H). The object unit element has dimensions dx and dy with coordinates depending on its position that can be described as (xS, yS, H). The size of the matrix sensor is represented by AR and BR. The lower left matrix corner has Cartesian coordinates (0, 0, 0). Each pixel has dimensions Dc and Ay with coordinates (xm, ym, 0). The matrix has coordinates (xp, yp, zp) of its mass center.

The output signal from the matrix detection unit can be evaluated as a two-dimensional signal obtained from each pixel Umm. In the case of object presence, it can be determined using following relation:

$$U_{mm} = k \int_0^t \int_x^{x+\Delta x} \int_{y'}^{y+\Delta y} E(x,y,t) P(x,y,t) dx dy dt$$

where texp stands for exposure time, E(xI, yI, tI) denotes irradiance of point with coordinates (xI, yI), P(xI, yI) stands for special conversion function that is defined by the quantum efficiency of the detection unit and other characteristics, settings of the matrix etc., and k denotes the coefficient of proportionality.

The total irradiance of the pixel can be determined in case of radiant exitance of light source over an area by using following equation $$E(n, y, t) = \int_{x_0}^{x_1} \int_{y_0}^{y_1} \frac{M(n)}{t^2} dx dy$$

where M stands for radiant exitance; a denotes angle between the perpendicular line drawn to the surface of the photo-sensor and line that connects the light source unit and the unit of the photo-sensor; 1 stands for distance between these units. As follows from above figure, the a angle can be determined geometrically using following equation:

$$\alpha = \left( \frac{H}{((x-x_1)^2 + (y-y_1)^2 + H^2)^{\frac{1}{2}}} \right)$$

Reference for the detection of objects by reflection value is taken from the hydraulics principle used to find the freely suspended particle in colloidal solution.

The LASER source fires a pulsed laser conical beam which when strikes at least one object returns back and is picked by the detection unit (302). The detection unit (302) is read in accordance with the above mathematical algorithm, for selection of at least one object and implementation of above formulas to calculate the various parameters.

The detection unit reads the intensity of different reflections at different pixels (Image Matrix) in reference to the incident angle on the detection unit.

Further, along with the above-mentioned parameters, the one or more data detected by the detection unit includes the LASER fire time (tO), Time of Receiving the Reflection Value (tI), the precise coordinates of spacecraft at the time of reception of signal.

In one implementation of the present invention, the separation between the center of LASER source and center of detection unit equipped on the satellite body is 5 cm. For instance, even for a Minimum distance of detection of 1 km range: 1 km=100000 cm.

Angle between the transmitted and the reflected pulse of LASER is measured as:

$F = \text{Arc/rad}$

As for a very high radius of 100000 cm the value of 05 cm is infinitesimally small and therefore the arc will be similar to a straight line.

$F = 5 \text{ cm}/100000 \text{ cm} = 0.00001° \sim 0°$

If the angle between the transmitted and the reflected pulse of LASER source is measured as 0°

$\text{Range} = (tI-t0)/2$

Then tracking of Orbital objects and coordinate conversion: Initially the coordinates will be measured for the satellite from the GPS unit onboard the satellite.

Figure 8:
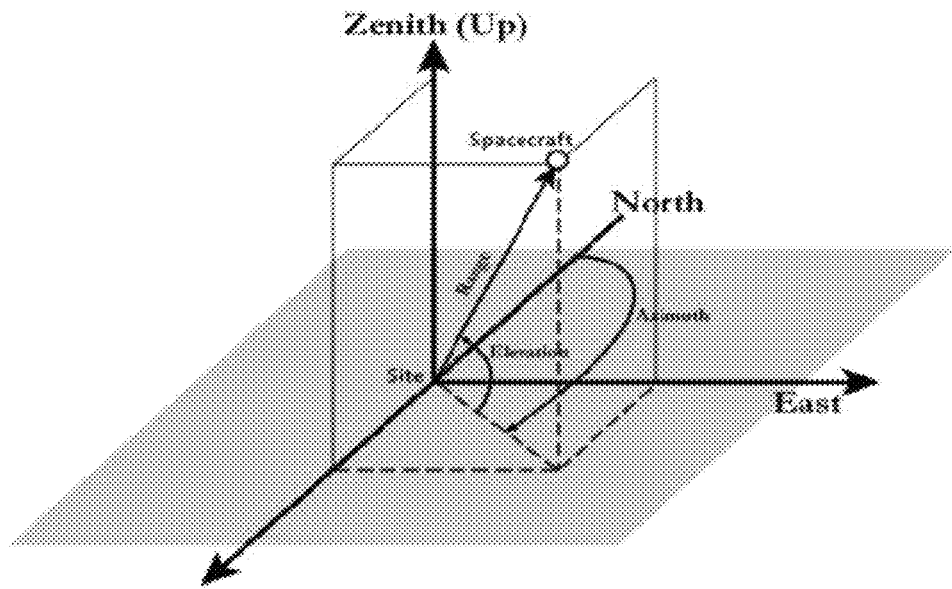
FIG. 8 illustrates an image of the various orbital elements of the satellite body in orbit in accordance with the embodiment of the present invention.

Referring to FIG. 8, illustrating an image of the various orbital elements of the satellite body in orbit. Let us assume that the spacecraft is in orbit on coordinates A (x, y, z). Here, in spherical coordinates, x, y, z is defined as:

$x = R \cos cp \cos k$ $y = R \cos cp \sin k$ $z = R \sin cp$ where R=Radius (Range) or Altitude, cp=Latitude, (Azimuth) I=Longitude, (Elevation).

In one embodiment of the present invention, these coordinates will be used to determine the data of the satellite body in orbit. The LASER Source and the detection unit mounted on the satellite body will detect the debris in orbit, with the above-mentioned approach. Let us assume that coordinate of object measured in reference to satellite are:

Range: r
Elevation: g
Azimuth: b

Then the referential coordinates of Debris are (x',y',z') where:

$X' = R \cos P \cos y$ $Y' = R \cos P \sin y$ $Z' = R \sin p$

The conversion of (X',Y',Z') will take place in reference to (C,U,Z) by using 3D geometry. After that the orbit prediction will be done.

In one embodiment of the present invention, the objects in the scanning area of the satellite found space are one of space debris (a byproduct of the mankind use) or the space junk.

In one non-limiting example, the detection unit is a photo detector.

In yet another embodiment of the present invention, the satellite body is a 2 U CubeSat. In another embodiment of the present invention, the satellite body is a Nano Satellite.

Some of the embodiments include identifying objects in space smaller than 5 cm

Some of the embodiments can also be used to check pollution levels in cities, track aircrafts, drones or any other flying object and many other uses.

Some of the embodiments may further include the information transfer to relevant agencies like pollution board, airports etc.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method for detecting and modeling objects in space using LIDAR, wherein the method comprising:
    transmitting, by a LASER source, a laser beam to detect at least one object in space;
    detecting, by a detection unit, one or more data related to the at least one object;
    processing, by a processing unit, said one or more data related to the at least one object received from the detection unit;
    determining, by a determination unit, one or more information from the processed data related to the at least one object;
    mapping, by a mapping unit, one or more information corresponding to the related at least one object;
    measuring, by a measuring unit, one or more parameters associated with at least one of the mapped objects; and
    modeling, by a modeling unit, the measurement data related to the at least one of the mapped objects;
    wherein, the method further comprises:
    capturing multiple data values of the object in nanoscale to form a locus;
    processing the locus to at least based on a different-calculus to computer orbit of the object; and
    tracking object's current-position and predicting a future path position.

2. The method of claim 1, wherein the LASER source and the detection unit are mounted on a satellite body on the zenith side at a conic angle defining the scanning area of the satellite body.

3. The method of claim 2, where the conic angle is the angle of dispersion required in order to maintain the intensity and the detecting capability of the laser beam.

4. The method of claim 1, wherein the detection is based upon the principle of reflection of the object in a vacuum.

5. The method of claim 1, wherein said one or more data detected is at least one of LASER fire time, LASER receiving time, Intensity of LASER fired, Intensity of LASER received, time stamp, etc.

6. The method of claim 1, wherein the processing comprises correlating said one or more data with at least one of satellite attitude determination, position and time using one or more trigonometric expressions and differential calculus.

7. The method of claim 1, wherein one or more information includes:
    position of the at least one object detected;
    distance between at least one object detected object and the satellite body;
    direction of the at least one object detected relative to the satellite body; and
    apparent size of the at least one object detected.

8. The method of claim 1, wherein one or more parameters are at least one of: spatiotemporal information of the at least one object mapped; hamiltonian of the at least one object mapped; flux density of the at least one object mapped over an area; lagrangian of the at least one object mapped; and collision probability analysis.

9. A system for detecting and modeling objects in space using LIDAR, wherein the system comprising:
    a satellite having on-board components comprising:
    a LASER source to transmit a laser beam to detect at least one object in space; a detection unit for detecting one or more data related to the at least one object; a terrestrial station communicatively linked to the satellite and comprising:
    a processing unit for processing said one or more data related to the at least one object received from the detection unit;
    a determination unit to determine one or more information from the processed data related to the at least one object;
    a mapping unit to map one or more information corresponding to the related at least one object;
    a measuring unit to measure one or more parameters associated with at least one of the mapped objects; and
    a modeling unit to model the measurement data related to the at least one of the mapped objects;
    wherein the system further captures multiple data values of the object in nanoscale to form a locus;
    process the locus to at least based on a differential-calculus to compute orbit of the object; and
    track object's current-position and predicting a future position.

* * * * *